US009814037B2

(12) United States Patent
Xue et al.

(10) Patent No.: US 9,814,037 B2
(45) Date of Patent: Nov. 7, 2017

(54) METHOD FOR EFFICIENT CHANNEL ESTIMATION AND BEAMFORMING IN FDD SYSTEM BY EXPLOITING UPLINK-DOWNLINK CORRESPONDENCE

(71) Applicant: Intel Corporation, Santa Clara, CA (US)

(72) Inventors: Feng Xue, Redwood City, CA (US); Qinghua Li, San Ramon, CA (US); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 14/109,211

(22) Filed: Dec. 17, 2013

(65) Prior Publication Data

US 2015/0003338 A1   Jan. 1, 2015

Related U.S. Application Data

(60) Provisional application No. 61/841,230, filed on Jun. 28, 2013.

(51) Int. Cl.
*H04B 7/00* (2006.01)
*H04W 72/04* (2009.01)
(Continued)

(52) U.S. Cl.
CPC ........ *H04W 72/0446* (2013.01); *H04B 7/024* (2013.01); *H04B 7/0452* (2013.01);
(Continued)

(58) Field of Classification Search
CPC . H04B 7/0452; H04B 7/0626; H04L 25/0242; H04L 25/021; H04L 25/03891
See application file for complete search history.

(56) References Cited

U.S. PATENT DOCUMENTS 8,160,976 B2   4/2012   Dwyer et al.
8,170,081 B2 *  5/2012  Forenza et al. ............... 375/141
(Continued)

FOREIGN PATENT DOCUMENTS

CN   104254067 A   12/2014
CN   105229934 A   1/2016
(Continued)

OTHER PUBLICATIONS

"International Application Serial No. PCT/US2014/031996, International Search Report mailed Aug. 26, 2014", 3 pgs.
(Continued)

Primary Examiner — Ricky Ngo
Assistant Examiner — Lan Huong Truong
(74) Attorney, Agent, or Firm — Schwegman Lundberg & Woessner, P.A.

(57) ABSTRACT

A method for selecting at least one parameter for downlink data transmission with a mobile user equipment. The method is executable by a wireless communication base station having multiple antennas configured to communicate wirelessly with the mobile user equipment. The method receives an uplink probing signal from the mobile user equipment. The method determines a plurality of angles of arrival for a corresponding plurality of paths between the mobile user equipment and the multiple antennas. The method transmits a plurality of downlink probing signals directionally toward corresponding angles of arrival in the plurality of angles of arrival. Each downlink probing signal is a virtual antenna port with respect to the mobile user equipment. The method receives channel state information. The method composes at least one of a rank indicator (RI), precoding matrix indicator (PMI), or modulating and coding scheme (MCS) for downlink data transmission to the mobile user equipment.

20 Claims, 4 Drawing Sheets

(51) Int. Cl.

| | |
|---|---|
| *H04W 76/02* | (2009.01) |
| *H04B 7/0452* | (2017.01) |
| *H04B 7/06* | (2006.01) |
| *H04W 56/00* | (2009.01) |
| *H04W 72/02* | (2009.01) |
| *H04L 25/02* | (2006.01) |
| *H04L 25/03* | (2006.01) |
| *H04W 88/02* | (2009.01) |
| *H04W 16/14* | (2009.01) |
| *H04W 8/00* | (2009.01) |
| *H04W 48/16* | (2009.01) |
| *H04L 12/18* | (2006.01) |
| *H04W 74/00* | (2009.01) |
| *H04W 74/08* | (2009.01) |
| *H04W 36/02* | (2009.01) |
| *H04W 68/04* | (2009.01) |
| *H04W 76/06* | (2009.01) |
| *H04B 7/024* | (2017.01) |
| *H04J 11/00* | (2006.01) |
| *H04L 5/14* | (2006.01) |
| *H04W 84/18* | (2009.01) |
| *H04W 88/06* | (2009.01) |
| *H04W 84/04* | (2009.01) |
| *H04W 48/12* | (2009.01) |

(52) U.S. Cl.
CPC ........ *H04B 7/0626* (2013.01); *H04J 11/005* (2013.01); *H04L 5/1469* (2013.01); *H04L 12/18* (2013.01); *H04L 25/021* (2013.01); *H04L 25/0242* (2013.01); *H04L 25/03891* (2013.01); *H04W 8/005* (2013.01); *H04W 16/14* (2013.01); *H04W 36/02* (2013.01); *H04W 48/16* (2013.01); *H04W 56/0005* (2013.01); *H04W 68/04* (2013.01); *H04W 72/02* (2013.01); *H04W 72/042* (2013.01); *H04W 74/004* (2013.01); *H04W 74/006* (2013.01); *H04W 74/0816* (2013.01); *H04W 76/02* (2013.01); *H04W 76/028* (2013.01); *H04W 76/06* (2013.01); *H04W 88/02* (2013.01); *H04W 48/12* (2013.01); *H04W 72/0406* (2013.01); *H04W 84/045* (2013.01); *H04W 84/18* (2013.01); *H04W 88/06* (2013.01)

(56) References Cited

U.S. PATENT DOCUMENTS

| | | | | |
|---|---|---|---|---|
| 8,213,978 | B1* | 7/2012 | Ho | H04W 24/02 370/227 |
| 8,259,599 | B2 | 9/2012 | Ghady et al. | |
| 8,462,688 | B1 | 6/2013 | Dinan | |
| 8,547,969 | B2 | 10/2013 | Watfa et al. | |
| 8,565,793 | B1 | 10/2013 | Koodli | |
| 8,654,815 | B1* | 2/2014 | Forenza | H04B 7/0626 375/141 |
| 8,682,354 | B2* | 3/2014 | Zhong | G01S 5/0036 370/252 |
| 8,965,338 | B2 | 2/2015 | Luft et al. | |
| 8,992,202 | B2 | 3/2015 | Pettis | |
| 9,025,479 | B2* | 5/2015 | Gaal | H04W 24/02 370/252 |
| 9,046,591 | B1* | 6/2015 | Yang | G01S 3/00 |
| 9,179,328 | B2* | 11/2015 | Li | H04W 24/02 |
| 9,320,063 | B2 | 4/2016 | Zaus | |
| 9,750,017 | B2 | 8/2017 | Zaus | |
| 2004/0014501 | A1 | 1/2004 | Kuwahara et al. | |
| 2006/0007043 | A1 | 1/2006 | Xin | |
| 2006/0292990 | A1* | 12/2006 | Karabinis | H04B 7/18513 455/63.4 |
| 2007/0211813 | A1 | 9/2007 | Talwar et al. | |
| 2008/0260918 | A1 | 10/2008 | Lai et al. | |
| 2008/0305805 | A1 | 12/2008 | Mondal et al. | |
| 2009/0323841 | A1 | 12/2009 | Clerckx et al. | |
| 2010/0046643 | A1 | 2/2010 | Mondal et al. | |
| 2010/0054237 | A1 | 3/2010 | Han et al. | |
| 2010/0056216 | A1 | 3/2010 | Li | |
| 2010/0265841 | A1 | 10/2010 | Rong et al. | |
| 2010/0311431 | A1 | 12/2010 | Papasakellariou et al. | |
| 2010/0316154 | A1* | 12/2010 | Park et al. | 375/267 |
| 2011/0069618 | A1 | 3/2011 | Wong et al. | |
| 2011/0103305 | A1 | 5/2011 | Ali et al. | |
| 2011/0143759 | A1 | 6/2011 | Choi et al. | |
| 2011/0149852 | A1 | 6/2011 | Olsson et al. | |
| 2011/0164668 | A1 | 7/2011 | Hoek et al. | |
| 2011/0164696 | A1 | 7/2011 | Choi et al. | |
| 2011/0194638 | A1 | 8/2011 | Erell et al. | |
| 2011/0199986 | A1 | 8/2011 | Fong et al. | |
| 2011/0216846 | A1 | 9/2011 | Lee et al. | |
| 2011/0244847 | A1 | 10/2011 | Mallik et al. | |
| 2011/0249637 | A1 | 10/2011 | Hammarwall et al. | |
| 2011/0268101 | A1 | 11/2011 | Wang et al. | |
| 2011/0275371 | A1 | 11/2011 | Roger | |
| 2012/0014462 | A1 | 1/2012 | Zummo et al. | |
| 2012/0071163 | A1 | 3/2012 | Klingenbrunn et al. | |
| 2012/0082082 | A1 | 4/2012 | Etemad et al. | |
| 2012/0120789 | A1 | 5/2012 | Ramachandran et al. | |
| 2012/0128089 | A1 | 5/2012 | Tsutsui | |
| 2012/0163235 | A1 | 6/2012 | Ho et al. | |
| 2012/0165019 | A1 | 6/2012 | Shintani et al. | |
| 2012/0252429 | A1 | 10/2012 | Yoshizawa | |
| 2012/0258729 | A1* | 10/2012 | Siomina | G01S 3/28 455/456.1 |
| 2012/0275401 | A1 | 11/2012 | Sun | |
| 2012/0281783 | A1 | 11/2012 | Cheng et al. | |
| 2012/0322489 | A1 | 12/2012 | Liu et al. | |
| 2013/0021925 | A1 | 1/2013 | Yin et al. | |
| 2013/0034082 | A1 | 2/2013 | Etemad et al. | |
| 2013/0039244 | A1 | 2/2013 | Sun | |
| 2013/0064129 | A1 | 3/2013 | Koivisto et al. | |
| 2013/0070703 | A1 | 3/2013 | Yasukawa et al. | |
| 2013/0077513 | A1* | 3/2013 | Ng et al. | 370/252 |
| 2013/0083661 | A1 | 4/2013 | Gupta et al. | |
| 2013/0083777 | A1 | 4/2013 | Rydnell et al. | |
| 2013/0088983 | A1 | 4/2013 | Pragada et al. | |
| 2013/0107849 | A1 | 5/2013 | Park | |
| 2013/0107977 | A1 | 5/2013 | Lakkis | |
| 2013/0114576 | A1 | 5/2013 | Kwon et al. | |
| 2013/0121185 | A1 | 5/2013 | Li et al. | |
| 2013/0153298 | A1 | 6/2013 | Pietraski et al. | |
| 2013/0155962 | A1 | 6/2013 | Hakola et al. | |
| 2013/0157670 | A1 | 6/2013 | Koskela et al. | |
| 2013/0163457 | A1 | 6/2013 | Kim et al. | |
| 2013/0201852 | A1 | 8/2013 | Chou et al. | |
| 2013/0201884 | A1 | 8/2013 | Freda | |
| 2013/0230081 | A1 | 9/2013 | Wernersson et al. | |
| 2013/0273924 | A1 | 10/2013 | Hakola et al. | |
| 2013/0288608 | A1 | 10/2013 | Fwu et al. | |
| 2014/0010221 | A1 | 1/2014 | Panian et al. | |
| 2014/0024386 | A1 | 1/2014 | Novak et al. | |
| 2014/0043630 | A1 | 2/2014 | Buser et al. | |
| 2014/0050086 | A1 | 2/2014 | Himayat et al. | |
| 2014/0056246 | A1 | 2/2014 | Chun et al. | |
| 2014/0098900 | A1* | 4/2014 | Bayesteh | H04B 7/0452 375/267 |
| 2014/0126549 | A1 | 5/2014 | Beale | |
| 2014/0128092 | A1 | 5/2014 | Xiong et al. | |
| 2014/0133401 | A1 | 5/2014 | Kaura et al. | |
| 2014/0156646 | A1 | 6/2014 | Brust et al. | |
| 2014/0171054 | A1 | 6/2014 | Cai et al. | |
| 2014/0177683 | A1 | 6/2014 | Krishnamurthy et al. | |
| 2014/0177744 | A1* | 6/2014 | Krishnamurthy | H04B 7/0469 375/267 |
| 2014/0177745 | A1 | 6/2014 | Krishnamurthy et al. | |
| 2014/0206367 | A1* | 7/2014 | Agee | H04W 28/0236 455/450 |
| 2014/0211673 | A1 | 7/2014 | Lu et al. | |

(56) References Cited

U.S. PATENT DOCUMENTS

| | | |
|---|---|---|
| 2014/0213259 A1 | 7/2014 | Teyeb et al. |
| 2014/0286291 A1 | 9/2014 | Einhaus et al. |
| 2014/0288699 A1 | 9/2014 | Williams et al. |
| 2014/0321313 A1 | 10/2014 | Seo et al. |
| 2014/0355562 A1 | 12/2014 | Gao et al. |
| 2015/0003325 A1 | 1/2015 | Sajadieh et al. |
| 2015/0003326 A1 | 1/2015 | Zaus |
| 2015/0003543 A1 | 1/2015 | Shirani-mehr et al. |
| 2015/0004980 A1 | 1/2015 | Vannithamby et al. |
| 2015/0004995 A1 | 1/2015 | Koc et al. |
| 2015/0056993 A1 | 2/2015 | Zhu et al. |
| 2015/0139006 A1 | 5/2015 | Seo et al. |
| 2015/0282029 A1 | 10/2015 | Faccin et al. |
| 2015/0296354 A1 | 10/2015 | Liao et al. |
| 2015/0372793 A1 | 12/2015 | Kang et al. |
| 2015/0373736 A1 | 12/2015 | Ji et al. |
| 2016/0100401 A1 | 4/2016 | Xiong et al. |
| 2016/0119967 A1 | 4/2016 | Zaus |
| 2016/0278069 A1 | 9/2016 | Lee et al. |

FOREIGN PATENT DOCUMENTS

| | | |
|---|---|---|
| CN | 105229942 A | 1/2016 |
| CN | 105230053 A | 1/2016 |
| CN | 105247924 A | 1/2016 |
| CN | 105264788 A | 1/2016 |
| CN | 105284059 A | 1/2016 |
| EP | 2590336 A1 | 5/2013 |
| EP | 3014787 A1 | 5/2016 |
| EP | 3014788 A1 | 5/2016 |
| EP | 3014790 A1 | 5/2016 |
| EP | 3014909 A1 | 5/2016 |
| EP | 3014923 A1 | 5/2016 |
| JP | 2011259263 A | 12/2012 |
| JP | 2016525305 A | 8/2016 |
| KR | 1020120030548 A | 3/2012 |
| KR | 1020120138791 A | 12/2012 |
| KR | 1020130021569 A | 3/2013 |
| KR | 1020130040749 A | 4/2013 |
| KR | 1020160003021 A | 1/2016 |
| TW | 201316712 A | 4/2013 |
| TW | 201517660 A | 5/2015 |
| TW | 201635825 A | 10/2016 |
| WO | WO-2010043752 A1 | 4/2010 |
| WO | WO-2010088828 A1 | 8/2010 |
| WO | WO-2010150568 A1 | 12/2010 |
| WO | WO-2011138495 A1 | 11/2011 |
| WO | WO-2012000535 A1 | 1/2012 |
| WO | WO-2012125931 A1 | 9/2012 |
| WO | WO-2013010418 A1 | 9/2012 |
| WO | WO-2013012222 A2 | 1/2013 |
| WO | WO-2013081377 A1 | 6/2013 |
| WO | WO-2014158255 A1 | 10/2014 |
| WO | WO-2014209451 A1 | 12/2014 |
| WO | WO-2014210441 A1 | 12/2014 |
| WO | WO-2014210471 A1 | 12/2014 |
| WO | WO-2014210477 A1 | 12/2014 |
| WO | WO-2014210493 A1 | 12/2014 |
| WO | WO-2014210500 A1 | 12/2014 |

OTHER PUBLICATIONS

"International Application Serial No. PCT/US2014/031996, Written Opinion mailed Aug. 26, 2014", 4 pgs.
"International Application Serial No. PCT/US2014/044540, International Search Report mailed Oct. 15, 2014", 3 pgs.
"International Application Serial No. PCT/US2014/044540, Written Opinion mailed Oct. 15, 2014", 6 pgs.
"International Application Serial No. PCT/US2014/044592, International Search Report mailed Sep. 29, 2014", 3 pgs.
"International Application Serial No. PCT/US2014/044592, Written Opinion mailed Sep. 29, 2014", 5 pgs.
"International Application Serial No. PCT/US2014/044606, International Search Report mailed Oct. 22, 2014", 3 pgs.
"International Application Serial No. PCT/US2014/044606, Written Opinion mailed Oct. 22, 2014", 6 pgs.
"International Application Serial No. PCT/US2014/044626, International Search Report mailed Oct. 22, 2014", 3 pgs.
"International Application Serial No. PCT/US2014/044626, Written Opinion mailed Oct. 22, 2014", 5 pgs.
"International Application Serial No. PCT/US2014/044640, International Search Report mailed Oct. 21, 2014", 4 pgs.
"International Application Serial No. PCT/US2014/044640, Written Opinion mailed Oct. 21, 2014", 6 pgs.
"Circuit Switched (CS) fallback in Evolved Packet System (EPS); Stage 2", 3GPP TS 23.272 V11.5.0. Technical Specification Group Services and System Aspects. Release 11., (Jun. 2013), 95 pgs.
"Evolved Universal Terrestrial Radio Access (E-UTRA); Multiplexing and channel coding", 3GPP TS 36.212 V12.0.0. Technical Specification Group Radio Access Network. Release 12., (Dec. 2013), 88 pgs.
"Evolved Universal Terrestrial Radio Access (E-UTRA); Physical channels and modulation", 3GPP TS 36.211 V12.0.0. Technical Specification Group Radio Access Network. Release 12., (Dec. 2013), 120 pgs.
"Evolved Universal Terrestrial Radio Access (E-UTRA); Physical layer procedures", 3GPP TS 36.213 V12.0.0. Technical Specification Group Radio Access Network. Release 12., (Dec. 2013), 186 pgs.
"Evolved Universal Terrestrial Radio Access (E-UTRA); Study on Small Cell Enhancements for E-UTRA and E-UTRAN—Higher layer aspects", 3GPP TR 36.842 V1.0.0. Technical Specification Group Radio Access Network. Release 12., 69 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.
"General Packet Radio Service (GPRS); Service description; Stage 2", 3GPP TS 23.060 V12.1.0. Technical Specification Group Services and System Aspects. Release 12., (Jun. 2013), 338 pgs.
"IEEE Standard for Air Interface for Broadband Wireless Access Systems", IEEE Std 802.16. IEEE Computer Society. IEEE Microwave Theory and Techniques Society., (Aug. 17, 2012), 2544 pgs.
"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"Part 11: Wireless LAN Medium Access Control (MAC) and Physical Layer (PHY) Specifications: Amendment 3: Enhancements for Very High Throughput in the 60 GHz Band", IEEE Std 802.11ad. Local and metropolitan area networks. IEEE Computer Society., (Dec. 28, 2012), 628 pgs.
Delmas, Jean P, "Chapter 4: Subspace Tracking for Signal Processing", Adaptive Signal Processing: Next Generation Solutions, John Wiley & Sons, Inc., (Jun. 16, 2010), 211-270.
Shirani-Mehr, Hooman, et al., "Practical Downlink Transmission Schemes for Future LTE Systems with Many Base-Station Antennas", IEEE Globecom, (2013), 5 pgs.
Yang, Bang, "Projection approximation subspace tracking", IEEE Transactions on Signal Processing, 43(1), (Jan. 1995), 95-107.
"U.S. Appl. No. 14/136,554, Non Final Office Action mailed Mar. 17, 2015", 11 pgs.
"U.S. Appl. No. 14/141,206, Non Final Office Action mailed Dec. 3, 2014", 13 pgs.
"U.S. Appl. No. 14/141,206, Response filed Apr. 2, 2015 to Non Final Office Action mailed Dec. 3, 2014", 12 pgs.

(56) References Cited

OTHER PUBLICATIONS

"U.S. Appl. No. 14/141,223, Non Final Office Action mailed Apr. 14, 2015", 18 pgs.
"Clarification on the scope of ISRP Filter Rule priority", LG Electronics, S2-115168, 3GPP TSG-SA2 Meeting #88, (Nov. 2011), 1-4.
"European Application Serial No. 14171648.0, Extended European Search Report mailed Dec. 22, 2014", 7 pgs.
"U.S. Appl. No. 14/133,215, Non Final Office Action mailed Feb. 2, 2016", 25 pgs.
"U.S. Appl. No. 14/133,215, Non Final Office Action mailed Oct. 8, 2015", 15 pgs.
"U.S. Appl. No. 14/136,554, Advisory Action mailed Dec. 8, 2015", 3 pgs.
"U.S. Appl. No. 14/136,554, Examiner Interview Summary mailed Dec. 1, 2015", 3 pgs.
"U.S. Appl. No. 14/136,554, Final Office Action mailed Sep. 21, 2015", 12 pgs.
"U.S. Appl. No. 14/136,554, Response filed Jun. 17, 2015 to Non Final Office Action mailed Mar. 17, 2015", 6 pgs.
"U.S. Appl. No. 14/136,554, Response filed Nov. 24, 2015 to Final Office Action mailed Sep. 21, 2015", 6 pgs.
"U.S. Appl. No. 14/141,067, Non Final Office Action mailed Jul. 8, 2015", 9 pgs.
"U.S. Appl. No. 14/141,067, Notice of Allowance mailed Dec. 10, 2015", 9 pgs.
"U.S. Appl. No. 14/141,067,Response filed Oct. 8, 2015 Non Final Office Action mailed Jul. 8, 2015", 9 pgs.
"U.S. Appl. No. 14/141,206, Advisory Action mailed Aug. 19, 2015", 4 pgs.
"U.S. Appl. No. 14/141,206, Applicant's Summary of Examiner Interview filed Sep. 15, 2015", 1 pg.
"U.S. Appl. No. 14/141,206, Examiner Interview Summary mailed Jan. 25, 2016", 3 pgs.
"U.S. Appl. No. 14/141,206, Examiner Interview Summary mailed Aug. 26, 2015", 3 pgs.
"U.S. Appl. No. 14/141,206, Final Office Action mailed May 15, 2015", 13 pgs.
"U.S. Appl. No. 14/141,206, Non Final Office Action mailed Jan. 7, 2016".
"U.S. Appl. No. 14/141,206, Response filed Aug. 11, 2015 to Final Office Action mailed May 15, 2015", 12 pgs.
"U.S. Appl. No. 14/141,223, Advisory Action mailed Dec. 11, 2015", 4 pgs.
"U.S. Appl. No. 14/141,223, Examiner Interview Summary mailed Dec. 2, 2015", 3 pgs.
"U.S. Appl. No. 14/141,223, Final Office Action mailed Oct. 7, 2015", 19 pgs.
"U.S. Appl. No. 14/141,223, Response filed Aug. 12, 2015 to Non Final Office Action Apr. 14, 2015", 11 pgs.
"U.S. Appl. No. 14/141,223, Response filed Dec. 2, 2015 to Final Office Action mailed Oct. 7, 2015", 8 pgs.
"U.S. Appl. No. 14/990,054, Preliminary Amendment filed Jan. 11, 2016", 7 pgs.
"European Application Serial No. 14171648.0, Response filed Jul. 17, 2015 Extended European Search Report mailed Dec. 22, 2014", 8 pgs.
"International Application Serial No. PCT/US2014/031996, International Preliminary Report on Patentability mailed Jan. 7, 2016", 6 pgs.
"International Application Serial No. PCT/US2014/044540, International Preliminary Report on Patentability mailed Jan. 7, 2016", 8 pgs.
"International Application Serial No. PCT/US2014/044592, International Preliminary Report on Patentability mailed Jan. 7, 2016", 7 pgs.
"International Application Serial No. PCT/US2014/044606, International Preliminary Report on Patentability mailed Jan. 7, 2016", 16 pgs.
"International Application Serial No. PCT/US2014/044626, International Preliminary Report on Patentability mailed Jan. 7, 2016", 7 pgs.
"Taiwanese Application Serial No. 103120032, Office Action mailed Sep. 23, 2015", W/ English Translation, 14 pgs.
"Taiwanese Application Serial No. 103120032, Response filed Dec. 16, 2015 to Office Action mailed Seo, 23, 2015", W/ English Claims, 17 pgs.
"Taiwanese Application Serial No. 103121919, Office Action mailed Dec. 17, 2015", W/ English Search Report, 10 pgs.
U.S. Appl. No. 14/990,054, filed Jan. 7, 2016, Resuming Packet Services in a Mobile Network.
U.S. Appl. No. 14/778,528, filed Sep. 18, 2015, User Equipment and Method for Resource Allocation and Device-to-Device Discovery Hopping.
"U.S. Appl. No. 14/133,215, Advisory Action mailed Aug. 4, 2016", 3 pgs.
"U.S. Appl. No. 14/133,215, Examiner Interview Summary mailed May 26, 2016", 2 pgs.
"U.S. Appl. No. 14/133,215, Examiner Interview Summary mailed Jul. 12, 16", 3 pgs.
"U.S. Appl. No. 14/133,215, Final Office Action mailed Jun. 3, 2016", 15 pgs.
"U.S. Appl. No. 14/133,215, Response filed Jul. 7, 2016 to Final Office Action mailed Jun. 3, 2016", 10 pgs.
"U.S. Appl. No. 14/141,223, Non Final Office Action mailed Jul. 28, 2016", 18 pgs.
"Correction of ISR description for CSFB with suspended PS bearers", 3GPP DRAFT; S2-104673 23401 R10 ISR in CSFB V3. 3rd Generation Partnership Project (3GPP). Mobile Competence Centre; 650. Route Des Lucioles ; F-06921 Sophia-Antipolis Cedex ; France, vol. SA WG2Prague, (Oct. 2010), 4 pgs.
"European Application Serial No. 14817214.1, Extended European Search Report mailed Dec. 23, 2016", 9 pgs.
"RA update after Cell Change Order (CCO) to GERAN", 3GPP Draft; S2-123292 WASS2-122780 RA Update After Cell Change Order (CCO) to GERAN. 3rd Generation Partnership Project (3GPP). Mobile Competence Centre; 650. Route Des Lucioles ; F-06921 Sophia-Anti, vol. SA WG2Barcelona. Spain, Retrieved from the Internet:<URL:http://www.3gpp.org/ftpjtsg sajWG2 Arch/ TSGS2 92 Barcelona/Docs/>[retrieved-on Jul. 12, 2012], (Jul. 2012), 3 pgs.
"U.S. Appl. No. 14/136,554, Non Final Office Action mailed Dec. 2, 2016", 11 pgs.
"U.S. Appl. No. 14/141,206, Response filed Nov. 23, 2016 to Final Office Action mailed Aug. 24, 2016", 9 pgs.
"U.S. Appl. No. 14/141,223, Response filed Oct.28, 2016 to Non Final Office Action mailed Jul. 28, 2016", 8 pgs.
"Correlation based explicit feedback", Alcatel-Lucent Shanghai Bell et al: 3GPP Draft; RI-100719, 3rd Generation Partnership Project (3GPP). Mobile Competence Centre ; 650, Route Deslucioles ; F-06921 Sophia-Antipolis Cedex ; France, (Jan. 13, 2010), 12 pgs.
"Discussion on dual RRC", 3GPP Draft; R2-131830 Dual RRC, 3rd Generation Partnership Project (3GPP), Mobile Competence Centre, May 10, 2013).
"European Application Serial No. 14816958.4, Extended European Search Report mailed Feb. 3, 2017", 11 pgs.
"European Application Serial No. 14817060.8, Extended European Search Report mailed Mar. 13, 2017", 12 pgs.
"European Application Serial No. 14817448.5, Partial Supplementary European Search Report mailed Feb. 3, 2017", 11 pgs.
"European Application Serial No. 14817851.0, Extended European Search Report mailed Mar. 2, 2017", 11 pgs.
"European Application Serial No. 14818323.9, Extended European Search Report mailed Feb. 23, 2017", 10 pgs.
"Evaluation of enhanced MIMO feedbacks for LTE-A", Intel Corporation (UK) Ltd: 3GPP Draft; R1-101808_Feedback. 3rd Generation Partnership Project (3GPP), Mobile Competence Centre ; 650, Route Des Lucioles ; F-06921 Sophia-Antipolis Cedex ; France, (Apr. 6, 2010), 1-3,5.
"Evaluation results for feedback enhancement (Scenario A and C)", LG Electronics: 3GPP Draft; RI-114351 LG Evaluation Results (56) References Cited

OTHER PUBLICATIONS

SCNAC, 3rd Generation Partnership Project (3GPP), Mobile Competence Centre : 650, Route Des Lucioles ; F-06921 Sophia-Antipolis Cedex ; France, vol. RAN WG1, No. San Francisco, USA, (Nov. 21, 2011), 8 pgs.
"Generalized Transformation for adaptive codebooks", Samsung: 3GPP Draft; RI-102204 Adaptive Codebook REV1, 3rd Generation Partnership Project I3GPP), Mobile Competence Centre 650, Route Des Lucioles ; F-06921 Sophia-Antipolis Cedex ; France, vol. Ran WG1, No. Beijing , China;, (Apr. 6, 2010), 10 pgs.
"Impact of small cell enhancements to RRC functions", 3GPP TSG-RAN WG2 Meeting #82, R2-131672, (May 24, 2013), 6 pgs.
"On the remaining aspects of PMI and RI reporting accuracy tests fo r eDL-MIMO", QUALCOMM Incorporated: 3GPP Draft; R4-114211, 3rd Generation Partnership Project (3GPP), Mobile Competence Centre ; 650, Route Deslucioles ; F-06921 Sophia-Antipolis Cedex ; France, vol. RAN WG4, No. Athens, Greece, (Aug. 17, 2011), 4 pgs.
"Study on Small Cell Enhancements for E-UTRA and E-UTRAN—Higher layer aspects", 3GPP TR 36.842 No. V0.2.0 Release 12, (May 2013), 38 pgs.
"SU/MU MIMO Feedback with Codebook-based Vector Quantization", Samsung: 3GPP Draft; RI-094322 SUMU MIMO Feedback With Codebook-Based Vector Quantization, 3rd Generation Partnership Project (3GPP), Mobile Competence Centre ; 650, Route Des Lucioles ; F-06921 Sophia-Antipolis Cedex ; France, (Oct. 7, 2009), 9 pgs.
"Techniques for D2D Discovery", R1-132503, 3GPP TSG RAN WG1 Meeting #73, (May 2013), 1-7.
Alcatel-Lucent, et al., "Grid of beams for MU-MIMO", 3GPP Draft; RI-100421 GOB, 3rd Generation Partnership Project (3GPP), Mobile Competence Centre 650, Route Deslucioles ; F-06921 Sophia-Antipolis Cedex; France, vol. RAN WG1, No. Valencia, Spain, (Jan. 12, 2010), 6 pgs.
Alcatel-Lucent, Shanghai Bell, et al., "Considerations on CSI feedback enhancements fo r high-priority antenna configuration", 3GPP Draft; RI-112420 Considerations on CSI Feedback Enhancements for High-Priority Antenna Configurat10ns_Clean, 3rd Generation Partnership Project (3GPP), Mobile Competence Centre ; 650, Route Deslucioles, (Aug. 18, 2011), 7 pgs.
NTT Docomo, "Initial Views on Unified Approach for D2D Discovery", 3GPP Draft; R1-132371 D2D Discovery Unified. 3rd Generation Partnership Project (3GPP), Retrieved from the Internet: <URL:http://www.3gpp.org/ftpjtsg ran/WG1 RL1/TSGR1 73/Docs/>, (May 11, 2013), 7 pgs.
"3GPP TS Group Services and System Aspects(Release 8)", 3GPP TS 23.401, V8.16.0, (Mar. 2012).
"European Application Serial No. 14817214.1, Response filed Jul. 4, 2017 to Extended European Search Report dated Dec. 23, 2016", w/ English Translation, 15 pgs.
"European Application Serial No. 14817448.5, Extended European Search Report dated Jun. 9, 2017", w/ English Translation, 16 pgs.
"Korean Application Serial No. 10-2015-7033288, Office Action dated Jun. 30, 2017", w/ English Translation, 19 pgs.
"U.S. Appl. No. 14/133,215, Examiner Interview Summary dated Mar. 2, 2016", 3 pgs.
"U.S. Appl. No. 14/133,215, Preliminary Amendment filed Nov. 22, 2013", 10 pgs.
"U.S. Appl. No. 14/133,215, Response filed Mar. 7, 2016 to Non Final Office Action mailed Feb. 2, 2016", 12 pgs.
"U.S. Appl. No. 14/141,206, Final Office Action dated Aug. 24, 2016", 9 pgs.
"U.S. Appl. No. 14/141,206, Response filed May 6, 2016 to Non Final Office Action dated Jan. 7, 2016", 11 pgs.
"European Application Serial No. 14816958.4, Communication pursuant to Rules 161(2) and 162 EPC dated Feb. 4, 2016", 2 pgs.
"International Application Serial No. PCT/US2014/044640, International Preliminary Report on Patentability dated Jan. 7, 2016", 8 pgs.
"Taiwanese Application Serial No. 103121919, Response filed Jun. 20, 2016 to Office Action dated Dec. 17, 2015", W/ English Translation of Claims, 64 pgs.
"U.S. Appl. No. 14/778,528, Non Final Office Action dated Jun. 28, 2017", 22 pgs.
"U.S. Appl. No. 14/990,054, Corrected Notice of Allowance dated Jul. 27, 2017", 2 pgs.

* cited by examiner

METHOD FOR EFFICIENT CHANNEL ESTIMATION AND BEAMFORMING IN FDD SYSTEM BY EXPLOITING UPLINK-DOWNLINK CORRESPONDENCE

PRIORITY APPLICATION

This application claims the benefit of priority to U.S. Provisional Patent Application Ser. No. 61/841,230, filed Jun. 28, 2013, which is incorporated herein by reference in its entirety.

TECHNICAL FIELD

Embodiments pertain to operations and communications performed by electronic devices in wireless networks. Some embodiments relate to for selecting at least one parameter for downlink data transmission with a mobile user equipment.

BACKGROUND

A typical wireless communication base station, such as a cellular system, can include multiple antennas. The multiple antennas can increase sensitivity to received signals along a desired direction, while decreasing sensitivity away from the desired direction. In addition, the multiple antennas can direct a transmitted signal along a desired direction. Both of these directional effects are desirable for users having user equipment, such as cellular telephones. For instance, the directionality in sending and receiving signals can improve reception for a cellular telephone user, and can reduce instances of dropped calls.

In general, it is computationally intensive to monitor a direction from a base station to a user, and to provide signals to and from the multiple antennas to take advantage of the directional effects. Accordingly, there exists a need for reducing the computational complexity of the directional effects from a multiple-antenna communication system.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In a wireless communication system, a user with user equipment communicates wirelessly with a base station. For example, in a cellular telephone system, a cellular telephone user sends wireless signals to a base station, and receives wireless signals from the base station. The transmitted and received signals often traverse more than one physical path from the UE to the base station. For instance, one path may be directly between the UE and the base station, while another may include a bounce off a building.

Figure 1:
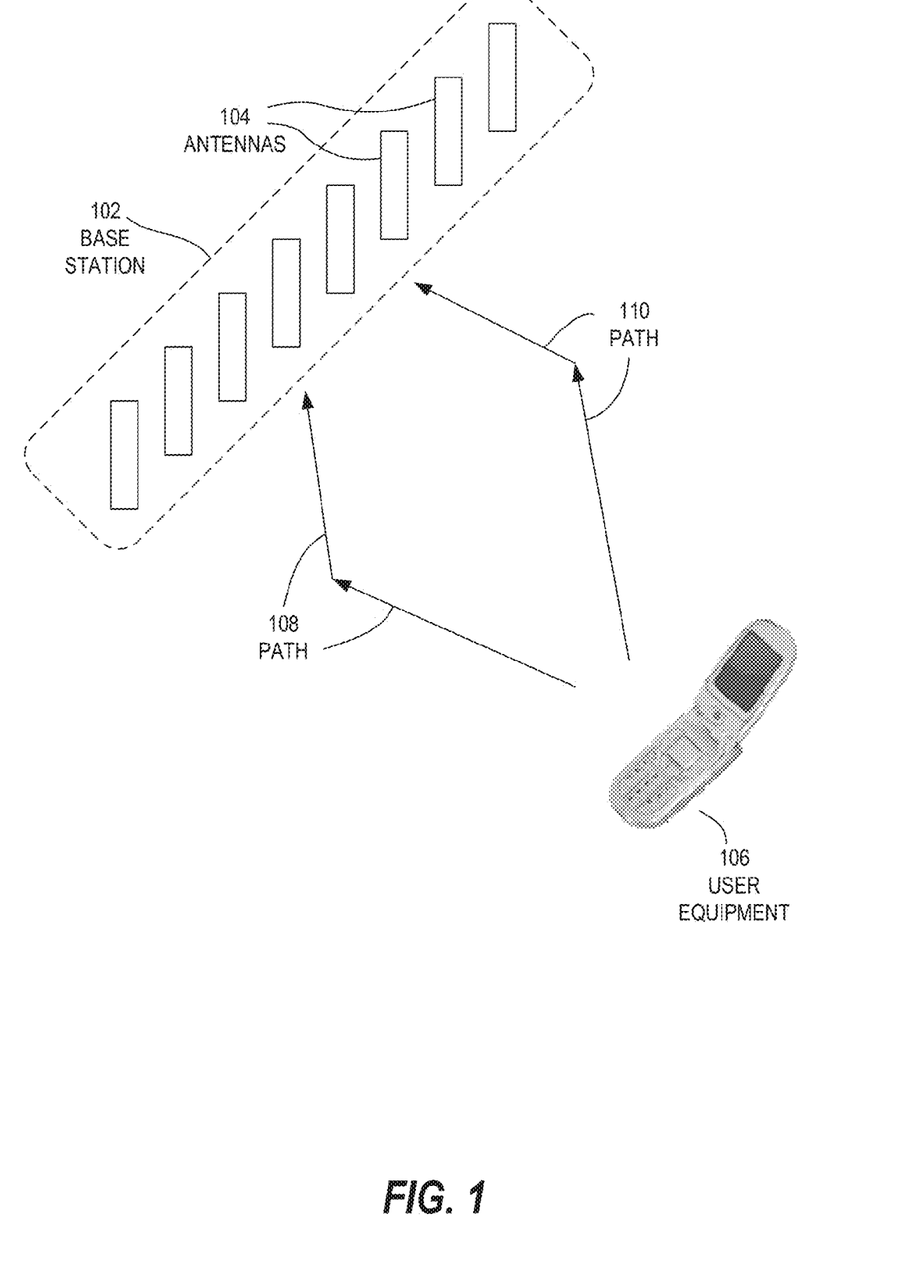
FIG. 1 illustrates an example of a base station having multiple antennas, a user having a user equipment, and multiple paths along which signals travel.

FIG. 1 illustrates an example of a base station (BS) 102 having multiple antennas 104, a user having a user equipment (UE) 106, and multiple paths 108, 110 between the base station 102 and the UE 106 along which signals travel. Each path 108, 110 has its own phase, its own power, its own angle-of-arrival (AoA) at the base station 102, and its own angle-of-departure (AoD) from the base station 102. The paths 108, 110 can change dynamically as the user moves. In some examples, the base station (BS) includes a relatively large number of antennas, such as 4, 8, 16, 32, and so forth. As the number of antennas increases, the precision of the signal directionality increases, and the computation complexity required to maintain that precision also increases. In some examples, the antennas 104 at the base station 102 are uniformly separated along one dimension. In some examples, for systems that use frequency-division duplexing (FDD) for uplink (UL) and downlink (DL) signals, the UL phase and DL phase on each path or subpath are independent of each other.

Figure 2:
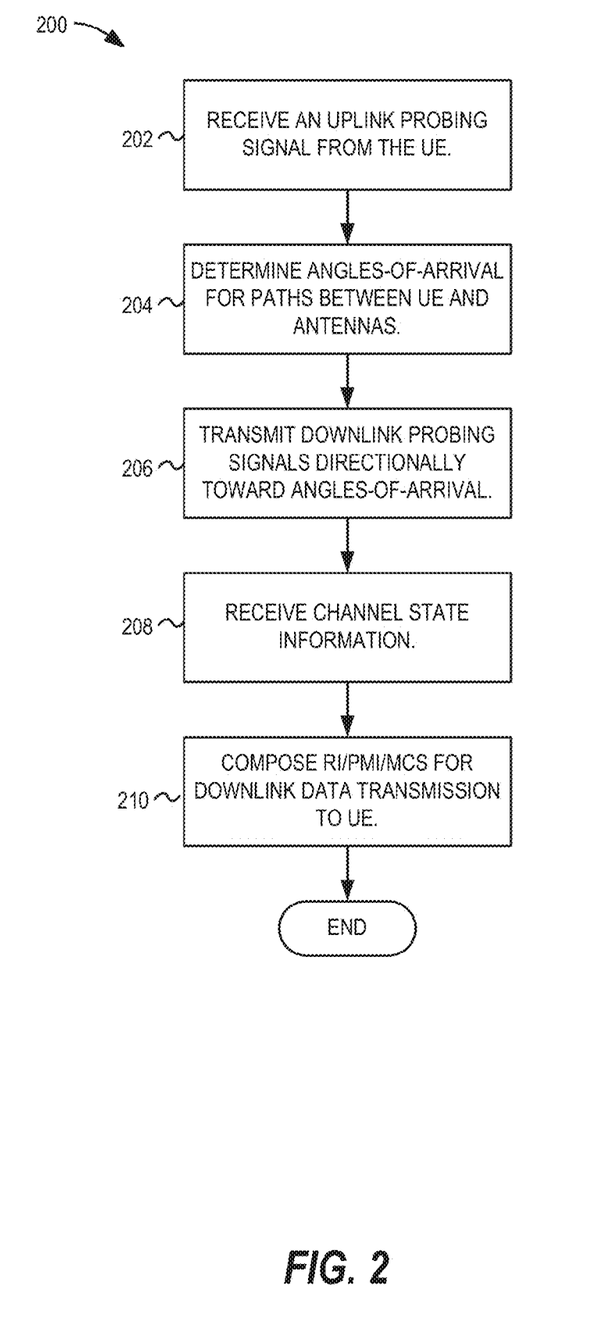
FIG. 2 illustrates a flow chart of an example of a method for selecting at least one parameter for downlink data transmission with the mobile user equipment.

FIG. 2 illustrates a flow chart of an example of a method 200 for selecting at least one parameter for downlink data transmission with the mobile user equipment. The method can be executed by a wireless communication base station, such as base station 102, having multiple antennas, such as antennas 104, configured to communicate wirelessly with mobile user equipment, such as user equipment 106.

At 202, method 200 receives an uplink probing signal from the mobile user equipment. At 204, method 200 determines, from the received uplink probing signal, a plurality of angles-of-arrival for a corresponding plurality of paths between the mobile user equipment and the multiple antennas. At 206, method 200 transmits, from the multiple antennas, a plurality of downlink probing signals directionally toward corresponding angles-of-arrival in the plurality of angles-of-arrival. Each downlink probing signal can be a virtual antenna port with respect to the mobile user equipment. At 208, method 200 receives, from the mobile user equipment, channel state information. At 210, method 200 composes, in response to the received channel state information, at least one of a rank indicator (RI), precoding matrix indicator (PMI), or modulating and coding scheme (MCS) for downlink data transmission to the mobile user equipment. Method 200 is but one example of a method for selecting at least one parameter for downlink data transmission with the mobile user equipment; other methods may also be used.

There are three basic aspects to the method 200. In a first aspect, mobile user equipment (UE) sends an uplink probing/sounding signal. The base station (BS) then determines or estimates angles-of-arrivals (AoAs) of several significant paths. A frequency translation method is also provided. In a second aspect, the BS sends out probing signals towards the selected AoAs, each as a different antenna port towards the UE. The probing signal is a virtual antenna port, such as DFT beamform vector. Depending on how many such AoAs are selected, different numbers of antenna ports can be allocated to the UE. The UE does channel estimation and feeds back the channel state information or beam selection information to the BS. In a third aspect, the BS composes the best rank indicator (RI), precoding matrix indicator (PMI), and/or modulating and coding scheme (MCS) for downlink (DL) data transmission. Each of these aspects is discussed below in greater detail.

There are numerous potential advantages to using the method described herein. For instance, in contrast with a scheme in which the angles-of-arrival are not initially determined or estimated, where a relatively large search space is randomly probed, the method discussed herein in which the angles-of-arrival are determined from an uplink probing signal is much more efficient. Another potential advantage is the new channel state feedback. In the present design, the DL antenna ports are formed by DFT vectors as a virtual antenna port. This can be considered as being a subset of current LTE code book, especially case of 8-tx antenna. In the present design, the UL channel feedback can be simplified to focus on rank determination and beam selection, which can reduce or simplify calculations. Furthermore, a frequency translation algorithm suitable for dealing with different angles is provided.

The first aspect involves UL channel sounding for AoA estimation, the UE is scheduled by the BS (eNB) to send out sounding signals from one of its antennas. Upon receiving signals on the UL at the BS, the UE and/or the BS estimates the AoAs of the signals.

An example of an AoA estimation algorithm follows. By ULA assumption, if there are N paths, the received signal in frequency domain will be the following format:

$$A := A_1 \beta_1 + \ldots + A_N \beta_N \quad (1)$$

where $$\beta_n = \begin{bmatrix} 1 \\ e^{-j2\pi\Delta \frac{f_{UL}}{F_0} \cos(\alpha_n)} \\ \vdots \\ e^{-j2\pi\Delta \frac{f_{UL}}{F_0} (M-1)\cos(\alpha_n)} \end{bmatrix} \quad (2)$$

is the spatial signature of the n-th path, $f_{UL}$ is the uplink frequency, $F_0$ is the carrier frequency, and $\Delta$ is the antenna distance in terms of wavelength at $F_0$. The received signal has the mathematical form of several DFT vectors.

By projecting the received signal towards different spatial signatures spanning the angular space, one can find the major power peaks along the directions. The projection, $$[1, e^{j2\pi\Delta_{UL} \cos\theta}, \ldots, e^{j2\pi(M-1)\Delta_{UL} \cos\theta}]$$

is considered for:

$$\theta \in [0, \pi)$$

where $\Delta_{UL}$ is the antenna spacing in terms of UL wave length. Peak values of this function over [0, pi) yields the estimated AoAs of the major paths. This set of estimated AoAs is written as:

$$A_{est} := \{A_1, A_2, \ldots, A_N\} \quad (3)$$

This is but one example of a suitable AoA estimation algorithm; other suitable algorithms can also be used.

The first aspect also involves Per-Path frequency translation.

The uplink probing signal and the downlink probing signals can be at different frequencies. Determining the downlink probing signal, in response to the uplink probing signal, can involve determining an uplink channel vector, multiplying the uplink channel vector by a diagonal matrix to form a product, and adopting the product to be the downlink channel vector. In some examples, the diagonal matrix includes, at the Mth row and column, a complex exponential factor having an exponent that varies as (M−1) multiplied by the difference in frequency between the uplink probing signal and the downlink probing signal.

For a particular path, the UL channel and DL channel (DFT) vectors can be $$\beta_{n,UL} = \begin{bmatrix} 1 \\ e^{-j2\pi\Delta \frac{f_{UL}}{F_0} \cos(\alpha_n)} \\ \vdots \\ e^{-j2\pi\Delta \frac{f_{UL}}{F_0} (M-1)\cos(\alpha_n)} \end{bmatrix}$$

and $$\beta_{n,DL} = \begin{bmatrix} 1 \\ e^{-j2\pi\Delta \frac{f_{DL}}{F_0} \cos(\alpha_n)} \\ \vdots \\ e^{-j2\pi\Delta \frac{f_{DL}}{F_0} (M-1)\cos(\alpha_n)} \end{bmatrix},$$

respectively. From the UL channel sounding/estimation process, the UL vector $\beta_{n,UL}$ is determined. To get the DL vector, the following translation is applied:

$$\hat{\beta}_{n,DL} = \text{diag}\left\{1, e^{-j2\pi\Delta \frac{f_{DL}-f_{UL}}{F_0} \cos(\alpha_n)}, \ldots, e^{-j2\pi\Delta \frac{f_{DL}-f_{UL}}{F_0} (M-1)\cos(\alpha_n)}\right\} \beta_{n,UL}$$

This translation process is applied for each significant direction, as it is identified. In the next step this estimated DFT vector is used for DL beamforming. A further step to help is to let UE switch its transmit antennas in uplink sounding.

The first aspect also involves UE antenna switching in UL sounding for multi-rank DL transmission.

UE will switch its transmit antennas in a pre-determined manner in the UL sounding process for eNB to detect multi-rank transmission opportunities. This allows the eNB to determine if it can discriminate the antennas for supporting DL multi-stream transmission. In general, the AoA/AoD resolution increases with the number of antennas. Given a reasonable number of antennas, such as 8×8 or 16×1, and possibly different antenna spacing, more accurate information on beam directions and phase/power information can be obtained by DL proactive probing in the second aspect.

The second aspect involves DL probing with precoded beams towards significant UL AoAs. In some examples, the virtual antenna ports are specifically designed based on $A_{est}$ from equation (3). The eNB tells the UE that N1 ports are supported in the transmission. Here N1 can take on the value of 1, 2, 4, or 8. One can choose N1 elements $A_{N1}$ from $A_{est}$ to cover the significant directions in $A_{est}$. Then, the eNB translates the DFT vectors in $A_{N1}$ according to the translation equation above. Now it uses the complex transposes of them as defining (pre-coding) vector for the DL virtual CSI-RS ports. (as in Step 2.1.2 later). Note that the method works, regardless of the size of the UL/DL frequency gap, due to the per-path translation and DL CSI-RS probing.

The second aspect also involves RS transmission on top of the chosen $A_{N1}$. The eNB applies CSI-RS signals on top of the N1 virtual ports. The resources on which the ports are transmitted are pre-determined and thus are known to the UE.

The second aspect also involves UE feedback design. The UE can measure and feedback channel state information or other measures. There are several options: As a first option, when N1 is small, e.g., less than 4, the UE uses the equations (1) and (2) above, and an older codebook for RI/CQI/PMI feedback. As a second option, when N1 is large, e.g., larger than 4, the UE first down-selects the ports into less than 4 based on CSI-RS measurement and throughput considerations, then calculates the best RI/CQI/PMI based on the selected beams. As a third option, the BS can provide explicit phase/power feedback for each port.

The third aspect involves DL data transmission. At this stage, the eNB has calculated a small set of DFT vectors suitable for data transmission towards the UE. Also, the eNB knows how to combine them with the number of data layers that are used. The eNB can use this information for data transmission, e.g., on the PDSCH channel.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Figure 3:
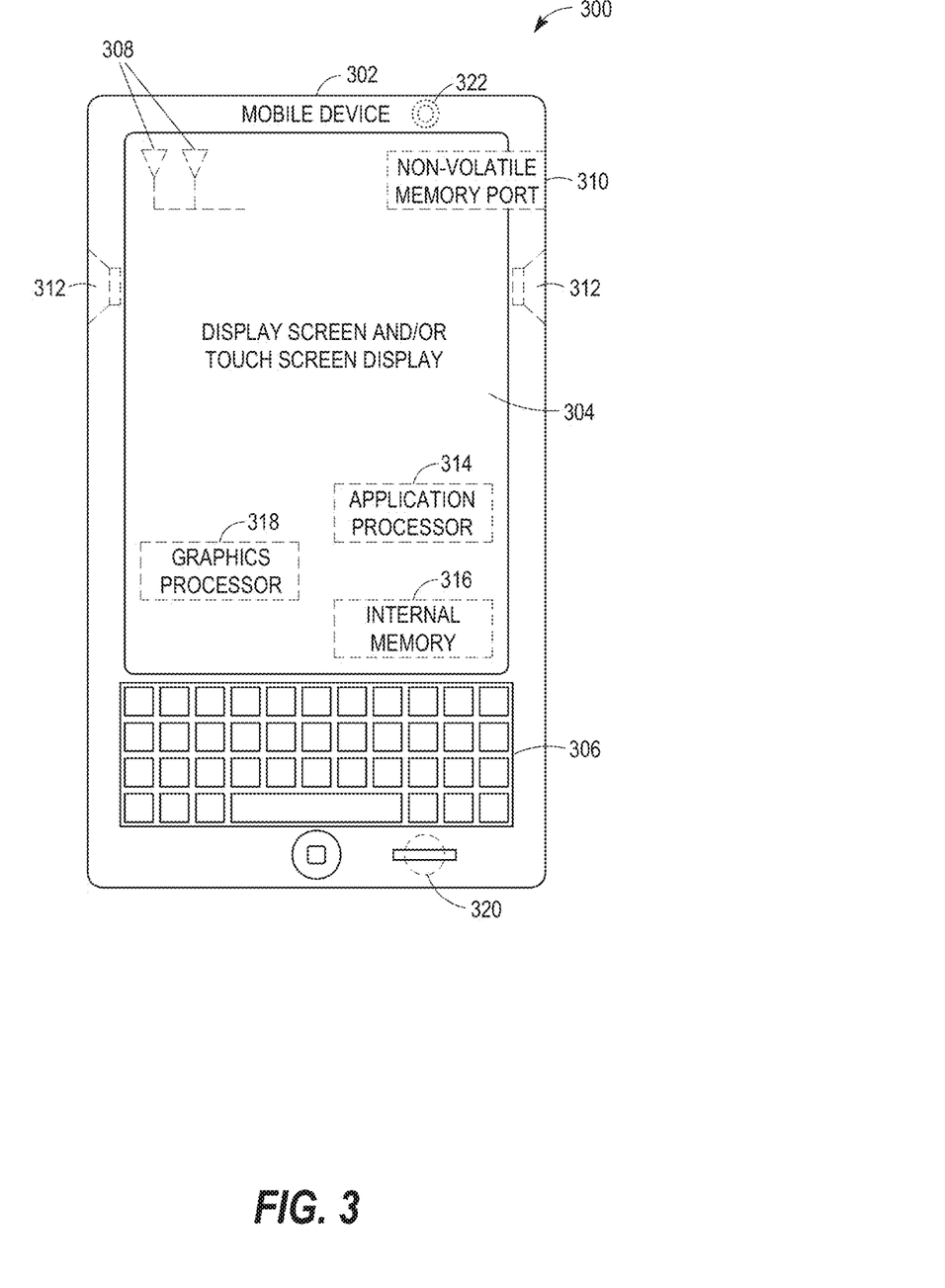
FIG. 3 illustrates an example of a mobile client device on which the configurations and techniques described herein can be deployed.

FIG. 3 illustrates an example of a mobile device 300. The mobile device 300 can be a user equipment (UE), a mobile station (MS), a mobile wireless device, a mobile communication device, a tablet, a handset, or other type of mobile wireless computing device. The mobile device 300 can include one or more antennas 308 within housing 302 that are configured to communicate with a hotspot, base station (BS), an evolved NodeB (eNodeB), or other type of WLAN or WWAN access point. The mobile device 300 can be configured to communicate using multiple wireless communication standards, including standards selected from 3GPP LTE, WiMAX, High Speed Packet Access (HSPA), Bluetooth, and Wi-Fi standard definitions. The mobile device 300 can communicate using separate antennas for each wireless communication standard or shared antennas for multiple wireless communication standards. The mobile device 300 can communicate in a WLAN, a WPAN, and/or a WWAN.

FIG. 3 also shows a microphone 320 and one or more speakers 312 that can be used for audio input and output from the mobile device 300. A display screen 304 can be a liquid crystal display (LCD) screen, or other type of display screen such as an organic light emitting diode (OLED) display. The display screen 304 can be configured as a touch screen. The touch screen can use capacitive, resistive, or another type of touch screen technology. An application processor 314 and a graphics processor 318 can be coupled to internal memory 316 to provide processing and display capabilities. A non-volatile memory port 310 can also be used to provide data input/output options to a user. The non-volatile memory port 310 can also be used to expand the memory capabilities of the mobile device 300. A keyboard 306 can be integrated with the mobile device 300 or wirelessly connected to the mobile device 300 to provide additional user input. A virtual keyboard can also be provided using the touch screen. A camera 322 located on the front (display screen) side or the rear side of the mobile device 300 can also be integrated into the housing 302 of the mobile device 300.

Figure 4:
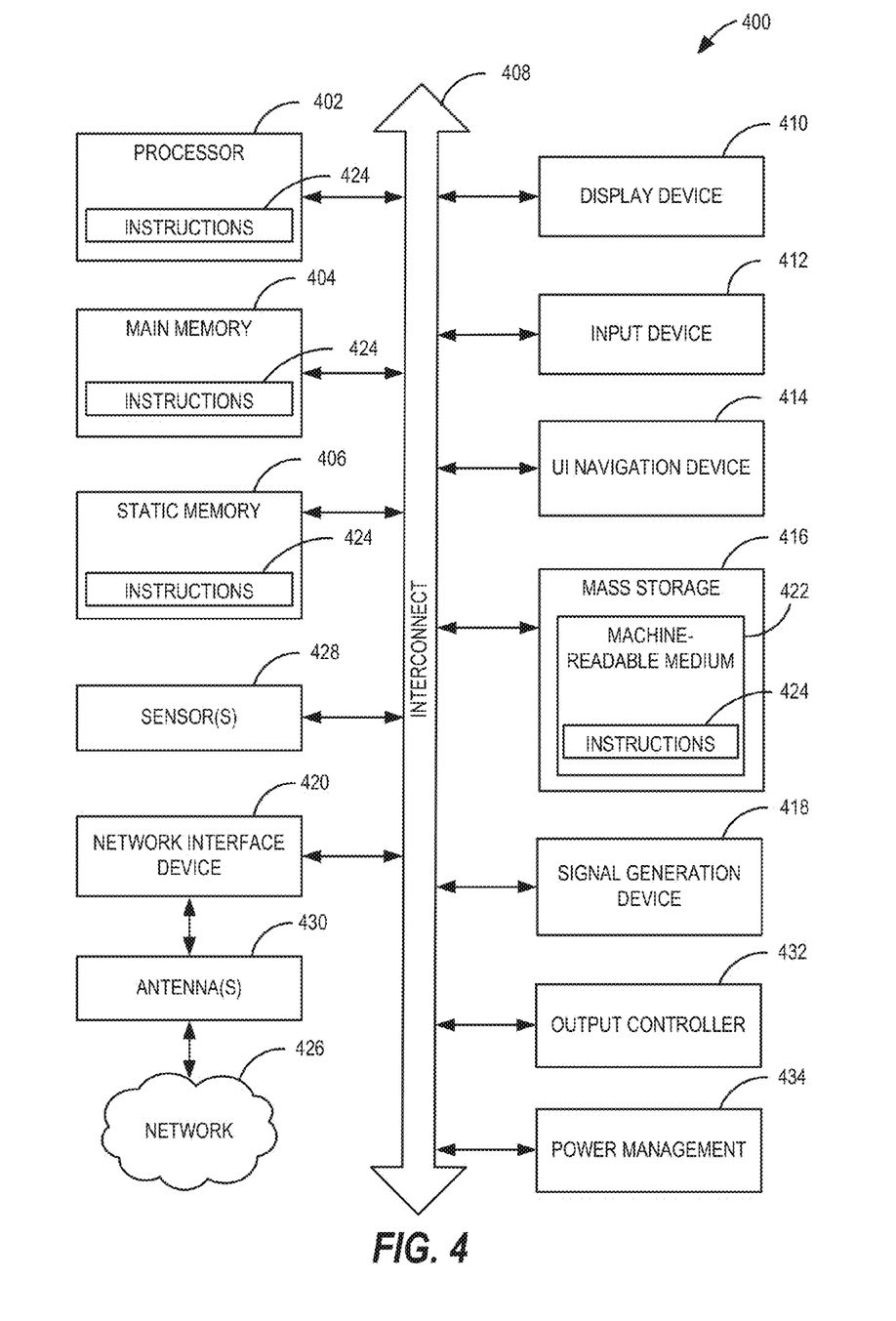
FIG. 4 illustrates an example computer system that can be used as a computing platform for the computing or networking devices described herein.

FIG. 4 is a block diagram illustrating an example computer system machine 400 upon which any one or more of the methodologies herein discussed can be run. Computer system machine 400 can be embodied as the base station 102, the antennas 104, the user equipment 106, or any other computing platform described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 400 includes a processor 402 (e.g., a central processing unit (CPU), a graphics processing unit (GPU) or both), a main memory 404 and a static memory 406, which communicate with each other via an interconnect 408 (e.g., a link, a bus, etc.). The computer system machine 400 can further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are a touch screen display. The computer system machine 400 can additionally include a storage device 416 (e.g., a drive unit), a signal generation device 418 (e.g., a speaker), an output controller 432, a power management controller 434, and a network interface device 420 (which can include or operably communicate with one or more antennas 430, transceivers, or other wireless communications hardware), and one or more sensors 428, such as a Global Positioning Sensor (GPS) sensor, compass, location sensor, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 can also reside, completely or at least partially, within the main memory 404, static memory 406, and/or within the processor 402 during execution thereof by the computer system machine 400, with the main memory 404, static memory 406, and the processor 402 also constituting machine-readable media.

While the machine-readable medium 422 is illustrated in an example embodiment to be a single medium, the term "machine-readable medium" can include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 424 can further be transmitted or received over a communications network 426 using a transmission medium via the network interface device 420 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes the subject matter embodied by a method for selecting at least one parameter for downlink data transmission with a mobile user equipment, the method executable by a wireless communication base station having multiple antennas configured to communicate wirelessly with the mobile user equipment, the method including receiving an uplink probing signal from the mobile user equipment; determining, from the received uplink probing signal, a plurality of angles-of-arrival for a corresponding plurality of paths between the mobile user equipment and the multiple antennas; transmitting, from the multiple antennas, a plurality of downlink probing signals directionally toward corresponding angles-of-arrival in the plurality of angles-of-arrival, each downlink probing signal being a virtual antenna port with respect to the mobile user equipment; receiving, from the mobile user equipment, channel state information; and composing, in response to the received channel state information, at least one of a rank indicator (RI), precoding matrix indicator (PMI), or modulating and coding scheme (MCS) for downlink data transmission to the mobile user equipment.

In Example 2, the subject matter of Example 1 can optionally include wherein each downlink probing signal appears to originate from a different location from the point of view of the mobile user equipment.

In Example 3, the subject matter of one or any combination of Examples 1-2 can optionally include wherein determining, from the received uplink probing signal, a plurality of angles-of-arrival for a corresponding plurality of paths between the mobile user equipment and the multiple antennas includes employing an angle-of-arrival estimation algorithm.

In Example 4, the subject matter of Example 3 can optionally include wherein the angle-of-arrival estimation algorithm: projects the received uplink probing signal toward different spatial signatures spanning the angular space; determines peak values from the projection; and adopts the peak values as estimated angles-of-arrival.

In Example 5, the subject matter of one or any combination of Examples 1-4 can optionally include wherein the uplink probing signal and the downlink probing signals are at different frequencies.

In Example 6, the subject matter of Example 5 can optionally include wherein determining the downlink probing signal, in response to the uplink probing signal, includes: determining an uplink channel vector; multiplying the uplink channel vector by a diagonal matrix to form a product; and adopting the product to be the downlink channel vector.

In Example 7, the subject matter of Example 6 can optionally include wherein the diagonal matrix includes, at the Mth row and column, a complex exponential factor having an exponent that varies as (M−1) multiplied by the difference in frequency between the uplink probing signal and the downlink probing signal.

In Example 8, the subject matter of one or any combination of Examples 6-7 can optionally further include forming a complex transpose of the product; and adopting the complex transpose as a defining vector for downlink virtual channel state information reference signal ports.

In Example 9, the subject matter of one or any combination of Examples 6-8 can optionally further include applying channel state information reference signals on top of the plurality of virtual antenna ports.

In Example 10, the subject matter of one or any combination of Examples 1-9 can optionally further include for virtual antenna ports numbering greater than four, downselecting the virtual antenna ports to a number fewer than four based on channel state information reference signal measurements.

Example 11 includes the subject matter embodied by a wireless communication base station having multiple antennas configured to communicate wirelessly with the mobile user equipment, the wireless communication base station including circuitry configured to: receive an uplink probing signal from the mobile user equipment; determine, from the received uplink probing signal, a plurality of angles-of-arrival for a corresponding plurality of paths between the mobile user equipment and the multiple antennas; transmit, from the multiple antennas, a plurality of downlink probing signals directionally toward corresponding angles-of-arrival in the plurality of angles-of-arrival, each downlink probing signal being a virtual antenna port with respect to the mobile user equipment; receive, from the mobile user equipment, channel state information; and compose, in response to the received channel state information, at least one of a rank indicator (RI), precoding matrix indicator (PMI), or modulating and coding scheme (MCS) for downlink data transmission to the mobile user equipment.

In Example 12, the subject matter of Example 11 can optionally include wherein each downlink probing signal appears to originate from a different location from the point of view of the mobile user equipment.

In Example 13, the subject matter of one or any combination of Examples 11-12 can optionally include wherein determining, from the received uplink probing signal, a plurality of angles-of-arrival for a corresponding plurality of paths between the mobile user equipment and the multiple antennas includes: employing an angle-of-arrival estimation algorithm.

In Example 14, the subject matter of Example 13 can optionally include wherein the angle-of-arrival estimation algorithm: projects the received uplink probing signal toward different spatial signatures spanning the angular space; determines peak values from the projection; and adopts the peak values as estimated angles-of-arrival.

In Example 15, the subject matter of one or any combination of Examples 11-14 wherein the uplink probing signal and the downlink probing signals are at different frequencies.

In Example 16, the subject matter of Example 15 can optionally include wherein determining the downlink probing signal, in response to the uplink probing signal, includes: determining an uplink channel vector; multiplying the uplink channel vector by a diagonal matrix to form a product; and adopting the product to be the downlink channel vector.

In Example 17, the subject matter of Example 16 can optionally include wherein the diagonal matrix includes, at the Mth row and column, a complex exponential factor having an exponent that varies as (M−1) multiplied by the difference in frequency between the uplink probing signal and the downlink probing signal.

In Example 18, the subject matter of one or any combination of Examples 16-17 can optionally include wherein the circuitry is further configured to: form a complex transpose of the product; and adopt the complex transpose as a defining vector for downlink virtual channel state information reference signal ports.

In Example 19, the subject matter of one or any combination of Examples 16-18 can optionally include wherein the circuitry is further configured to: apply channel state information reference signals on top of the plurality of virtual antenna ports.

Example 20 includes the subject matter embodied by a method for selecting at least one parameter for downlink data transmission with a mobile user equipment, the method performed by a wireless communication base station having multiple antennas configured to communicate wirelessly with the mobile user equipment, the method including: receiving an uplink probing signal from the mobile user equipment; employing an angle-of-arrival estimation algorithm; determining, from the angle-of-arrival estimation algorithm, a plurality of angles-of-arrival for a corresponding plurality of paths between the mobile user equipment and the multiple antennas; transmitting, from the multiple antennas, a plurality of downlink probing signals directionally toward corresponding angles-of-arrival in the plurality of angles-of-arrival, each downlink probing signal being a virtual antenna port with respect to the mobile user equipment, each downlink probing signal appearing to originate from a different location from the point of view of the mobile user equipment the uplink probing signal and the downlink probing signals having different frequencies; receiving, from the mobile user equipment, channel state information; and composing, in response to the received channel state information, at least one of a rank indicator (RI), precoding matrix indicator (PMI), or modulating and coding scheme (MCS) for downlink data transmission to the mobile user equipment.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for selecting at least one parameter for downlink data transmission with a mobile user equipment, the method executable by a single wireless communication base station having multiple antennas configured to communicate wirelessly with the mobile user equipment, the method comprising:
- receiving an uplink probing signal from the mobile user equipment;
- determining, from the received uplink probing signal, a plurality of angles-of-arrival for a corresponding plurality of paths between the mobile user equipment and the multiple antennas of the single wireless communication base station, wherein each of the angles-of-arrival is associated with a corresponding one of the plurality of paths between the mobile user equipment and the single wireless communication base station, and each angle-of-arrival is determined based on projecting the received uplink probing signal towards a spatial signature of the corresponding one of the plurality of paths;
- transmitting, from the multiple antennas, a plurality of downlink probing signals, each downlink probing signal being transmitted directionally toward a corresponding one of the angles-of-arrival, each downlink probing signal being a virtual antenna port with respect to the mobile user equipment, each virtual antenna port formed by a discrete Fourier transform (DFT) vector;
- receiving, from the mobile user equipment, channel state information corresponding to a channel associated with one of the downlink probing signals; and
- composing, in response to the received channel state information, a rank indicator (RI) and a precoding matrix indicator (PMI) for downlink data transmission to the mobile user equipment.

2. The method of claim 1, further comprising:
composing, in response to the received channel state information, a modulating and coding scheme (MCS) for downlink data transmission to the mobile user equipment, wherein each downlink probing signal appears to originate from a different location from the point of view of the mobile user equipment.

3. The method of claim 1, wherein determining, from the received uplink probing signal, a plurality of angles-of-arrival for a corresponding plurality of paths between the mobile user equipment and the multiple antennas comprises:
employing an angle-of-arrival estimation algorithm.

4. The method of claim 3, wherein the angle-of-arrival estimation algorithm:
- projects the received uplink probing signal toward different spatial signatures spanning the angular space;
- determines peak values from the projection; and
- adopts the peak values as estimated angles-of-arrival.

5. The method of claim 1, wherein the uplink probing signal and the downlink probing signals are at different frequencies.

6. The method of claim 5, wherein determining the downlink probing signal, in response to the uplink probing signal, comprises:
- determining an uplink channel vector;
- multiplying the uplink channel vector by a diagonal matrix to form a product; and
- adopting the product to be a downlink channel vector.

7. The method of claim 6, wherein the diagonal matrix includes, at an Mth row and column, a complex exponential factor having an exponent that varies as (M−1) multiplied by the difference in frequency between the uplink probing signal and the downlink probing signal.

8. The method of claim 6, further comprising:
- forming a complex transpose of the product; and
- adopting the complex transpose as a defining vector for downlink virtual channel state information reference signal ports.

9. The method of claim 6, further comprising:
applying channel state information reference signals on top of the plurality of virtual antenna ports.

10. The method of claim 1, further comprising:
for virtual antenna ports numbering greater than four, downselecting the virtual antenna ports to a number fewer than four based on channel state information reference signal measurements.

11. A wireless communication base station having multiple antennas configured to communicate wirelessly with a mobile user equipment, the wireless communication base station including circuitry configured to:
- receive an uplink probing signal from the mobile user equipment;
- determine, from the received uplink probing signal, a plurality of angles-of-arrival for a corresponding plurality of paths between the mobile user equipment and the multiple antennas of the wireless communication base station, wherein each of the angles-of-arrival is associated with a corresponding one of the plurality of paths between the mobile user equipment and a single wireless communication base station, and each angle-of-arrival is determined based on projecting the received uplink probing signal towards a spatial signature of the corresponding one of the plurality of paths;
- transmit, from the multiple antennas, a plurality of downlink probing signals, each downlink probing signal being transmitted directionally toward a corresponding one of the angles-of-arrival, each downlink probing signal being a virtual antenna port with respect to the mobile user equipment, each virtual antenna port formed by a discrete Fourier transform (DFT) vector;
- receive, from the mobile user equipment, channel state information corresponding to a channel associated with one of the downlink probing signals; and
- compose, in response to the received channel state information, a rank indicator (RI) and a precoding matrix indicator (PMI) for downlink data transmission to the mobile user equipment.

12. The wireless communication base station of claim 11, wherein the circuitry is further configured to compose, in response to the received channel state information, a modulating and coding scheme (MCS) for downlink data transmission to the mobile user equipment, wherein each downlink probing signal appears to originate from a different location from the point of view of the mobile user equipment.

13. The wireless communication base station of claim 11, wherein determining, from the received uplink probing signal, a plurality of angles-of-arrival for a corresponding plurality of paths between the mobile user equipment and the multiple antennas comprises:
employing an angle-of-arrival estimation algorithm.

14. The wireless communication base station of claim 13, wherein the angle-of-arrival estimation algorithm:
- projects the received uplink probing signal toward different spatial signatures spanning the angular space;
- determines peak values from the projection; and
- adopts the peak values as estimated angles-of-arrival.

15. The wireless communication base station of claim 11, wherein the uplink probing signal and the downlink probing signals are at different frequencies.

16. The wireless communication base station of claim 15, wherein determining the downlink probing signal, in response to the uplink probing signal, comprises:
- determining an uplink channel vector;
- multiplying the uplink channel vector by a diagonal matrix to form a product; and
- adopting the product to be a downlink channel vector.

17. The wireless communication base station of claim 16, wherein the circuitry is further configured to:
- form a complex transpose of the product; and
- adopt the complex transpose as a defining vector for downlink virtual channel state information reference signal ports.

18. The wireless communication base station of claim 16, wherein the circuitry is further configured to:
- apply channel state information reference signals on top of the plurality of virtual antenna ports.

19. A method for selecting at least one parameter for downlink data transmission with a mobile user equipment, the method performed by a single wireless communication base station having multiple antennas configured to communicate wirelessly the mobile user equipment, the method comprising:
- receiving an uplink probing signal from the mobile user equipment;
- employing an angle-of-arrival estimation algorithm;
- determining, from the angle-of-arrival estimation algorithm, a plurality of angles-of-arrival for a corresponding plurality of paths between the mobile user equipment and the multiple antennas of the single wireless communication base station, wherein each of the angles-of-arrival is associated with a corresponding one of the plurality of paths between the mobile user equipment and the single wireless communication base station, and each angle-of-arrival is determined based on projecting the received uplink probing signal towards a spatial signature of the corresponding one of the plurality of paths;
- transmitting, from the multiple antennas, a plurality of downlink probing signals, each downlink probing signal being transmitted directionally toward a corresponding one of the angles-of-arrival, each downlink probing signal being a virtual antenna port with respect to the mobile user equipment, each virtual antenna port formed by a discrete Fourier transform (DFT) vector, each downlink probing signal appearing to originate from a different location from the point of view of the mobile user equipment and the uplink probing signal and the downlink probing signals having different frequencies;
- receiving, from the mobile user equipment, channel state information corresponding to a channel associated with one of the plurality of downlink probing signals; and
- composing, in response to the received channel state information, a rank indicator (RI) and a precoding matrix indicator (PMI) for downlink data transmission to the mobile user equipment.

20. A wireless communication base station having multiple antennas configured to communicate wirelessly with a mobile user equipment, the wireless communication base station including circuitry configured to:
- receive an uplink probing signal from the mobile user equipment;
- determine, from the received uplink probing signal, a plurality of angles-of-arrival for a corresponding plurality of paths between the mobile user equipment and the multiple antennas, wherein each of the plurality of angles-of-arrival is associated with a corresponding one of the plurality of paths;
- transmit, from the multiple antennas, a plurality of downlink probing signals directionally toward corresponding angles-of-arrival in the plurality of angles-of-arrival, each downlink probing signal being a virtual antenna port with respect to the mobile user equipment;
- receive, from the mobile user equipment, channel state information corresponding to a channel associated with one of the plurality of downlink probing signals; and
- compose, in response to the received channel state information, a rank indicator (RI) and a precoding matrix indicator (PMI) for downlink data transmission to the mobile user equipment, wherein the uplink probing signal and the downlink probing signals are at different frequencies,
wherein determining the downlink probing signal, in response to the uplink probing signal, comprises:
determining an uplink channel vector;
multiplying the uplink channel vector by a diagonal matrix to form a product;
adopting the product to be a downlink channel vector, and
wherein the diagonal matrix includes, at an Mth row and column, a complex exponential factor having an exponent that varies as (M−1) multiplied by the difference in frequency between the uplink probing signal and the downlink probing signal.

* * * * *

UNITED STATES PATENT AND TRADEMARK OFFICE
CERTIFICATE OF CORRECTION

PATENT NO. : 9,814,037 B2
APPLICATION NO. : 14/109211
DATED : November 7, 2017
INVENTOR(S) : Xue et al.

Page 1 of 1

It is certified that error appears in the above-identified patent and that said Letters Patent is hereby corrected as shown below:

On the Title Page

On page 4, in Column 1, item (56), under "Other Publications", Line 26, delete "14/141,067,Response" and insert --14/141,067, Response-- therefor On page 4, in Column 2, item (56), under "Other Publications", Line 7, delete "Seo," and insert --Sep.-- therefor On page 5, in Column 1, item (56), under "Other Publications", Line 13, delete "fo r" and insert --for-- therefor On page 5, in Column 1, item (56), under "Other Publications", Line 35, delete "fo r" and insert --for-- therefor In the Claims In Column 13, Line 22, in Claim 19, after "wirelessly", insert --with--

In Column 14, Line 1, in Claim 19, delete "equipment" and insert --equipment,-- therefor Signed and Sealed this
Twenty-eighth Day of May, 2019

Andrei Iancu
*Director of the United States Patent and Trademark Office*